Dec. 31, 1929. F. L. WILLRODT Re. 17,543

STEERING ATTACHMENT FOR TRACTORS

Original Filed June 30, 1926 4 Sheets-Sheet 1

Inventor

Fred L. Willrodt

By Hiram A. Sturges

Attorney

Dec. 31, 1929. F. L. WILLRODT Re. 17,543

STEERING ATTACHMENT FOR TRACTORS

Original Filed June 30, 1926 4 Sheets-Sheet 2

Inventor

Fred L. Willrodt

By Hiram A. Sturges

Attorney

STEERING ATTACHMENT FOR TRACTORS

Original Filed June 30, 1926 4 Sheets-Sheet 3

Inventor
Fred L. Willrodt
By
Hiram A. Sturges
Attorney

Dec. 31, 1929. F. L. WILLRODT Re. 17,543
STEERING ATTACHMENT FOR TRACTORS
Original Filed June 30, 1926 4 Sheets-Sheet 4
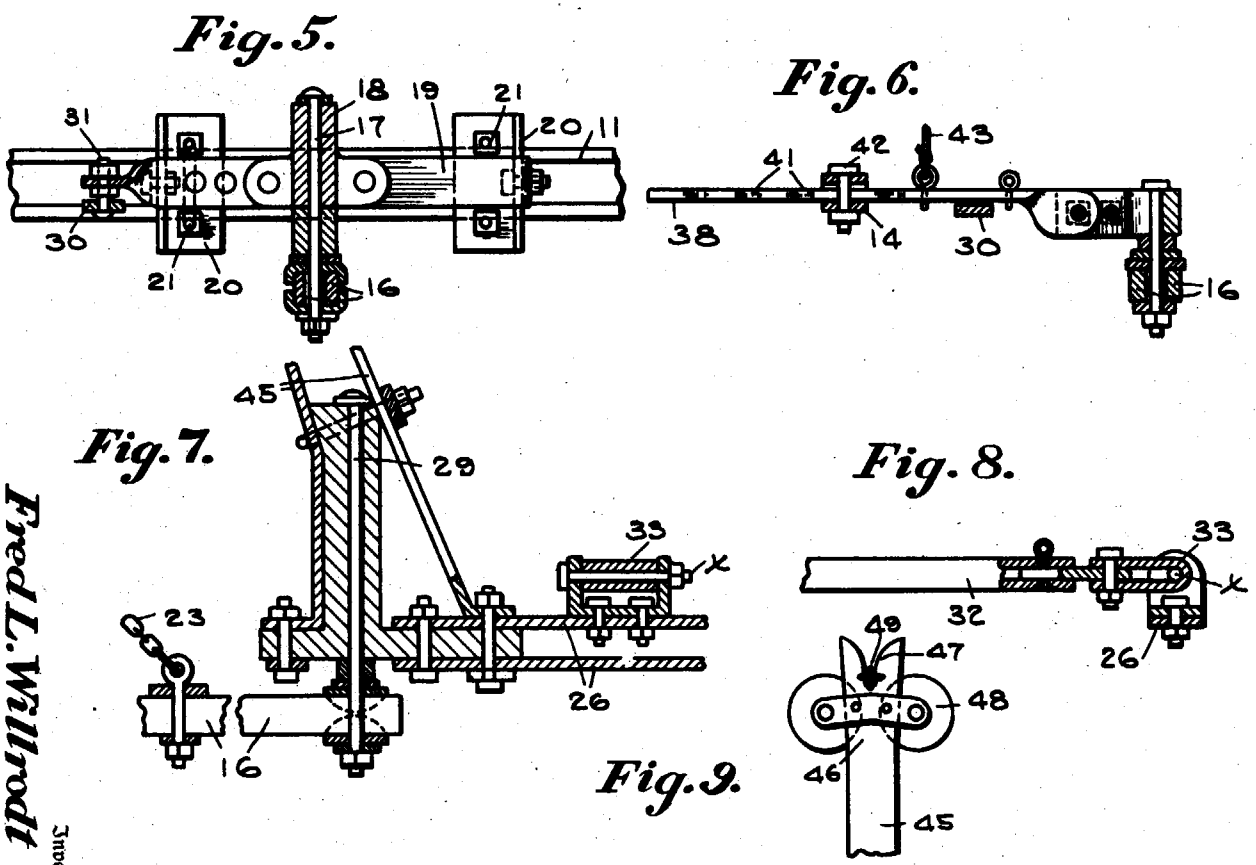
Inventor
Fred L. Willrodt
By Hiram A. Sturges
Attorney Reissued Dec. 31, 1929

Re. 17,543

REISSUED

UNITED STATES PATENT OFFICE

FRED L. WILLRODT, OF OMAHA, NEBRASKA

STEERING ATTACHMENT FOR TRACTORS

Original No. 1,639,246, dated August 16, 1927, Serial No. 119,656, filed June 30, 1926. Application for reissue filed August 15, 1929. Serial No. 385,986.

This invention relates to a steering attachment for tractors, of the class adapted to accomplish steering a tractor when plowing and listing by use of a guide adapted to travel in a furrow.

One of the objects of the invention is to provide a shoe for the attachment at the front of the tractor which will be automatically maintained parallel with the line of traction so that the supporting-bar for the guide will be maintained approximately at right-angles to the furrow.

Another object is to provide a steering attachment of such construction that the tractor may travel at selected distances from the furrow, the distance of the shoe from the furrow not being changed.

Still another object is to provide a standard for the steering attachment for use when supporting the guides when "turning about" at the end of a field or when moving the guides to the right or left side of the line of traction.

Still another object is to provide an attachment of the class described which will resist side stresses directed thereto while cultivating ground which is inclined transversely to the line of travel.

The invention includes a steering attachment adapted to be used for listing and general cultivation of the ground as well as for plowing.

With the foregoing objects in view and others to be mentioned hereinafter, the invention presents a new and useful construction, combination and arrangement of parts as described and claimed and as illustrated in the accompanying drawings, it being understood that changes may be made in form, size, proportion of parts and minor details, said changes being within the scope of the invention as claimed.

In the drawings,

Figs. 5, 6, 7, 8 and 9 are enlarged details.

Fig. 5 is a sectional view on line 5—5 of Fig. 1.

Fig. 6 is a sectional view on line 6—6 of Fig. 1.

Fig. 7 is a sectional view on line 7—7 of Fig. 1.

Fig. 8 is a sectional view on line 8—8 of Fig. 1.

Fig. 9 is a plan view of a chain-holder for the standard of the steering attachment.

Figure 1:
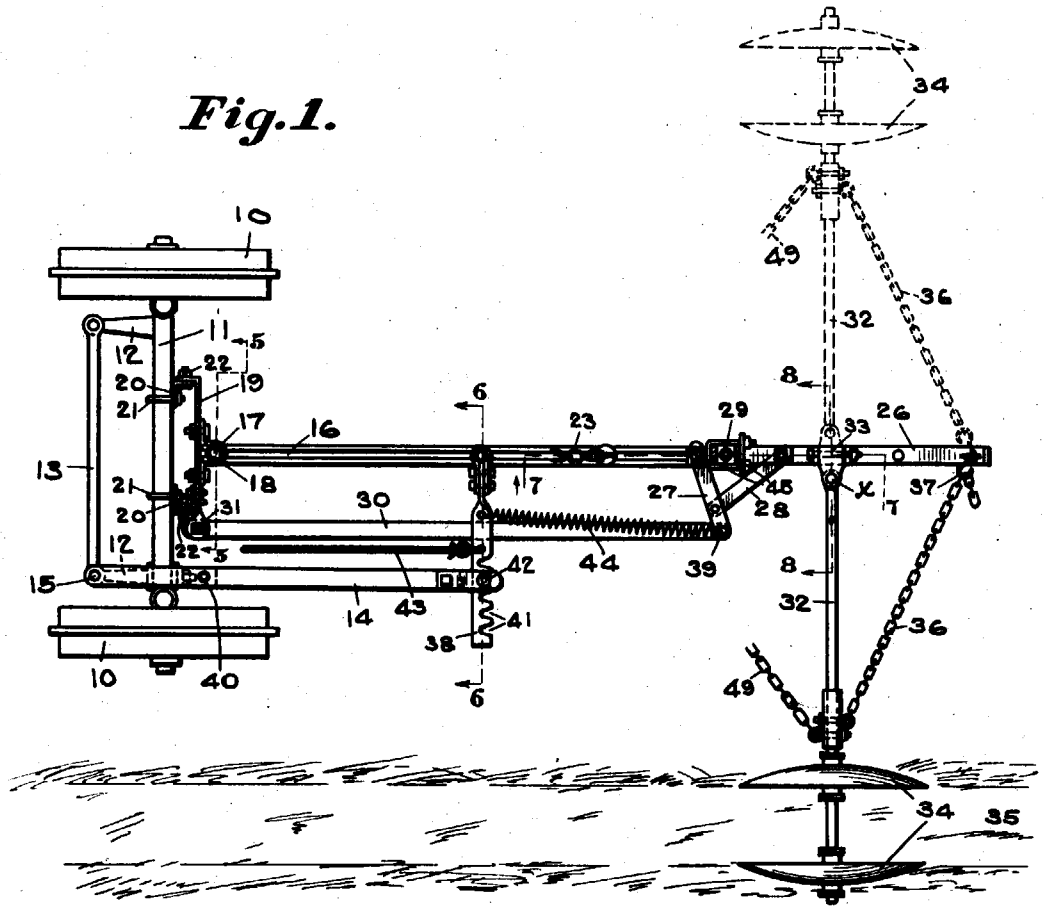
Fig. 1 is a plan view partly broken away, of the steering attachment secured to the front part of a tractor.

Referring now to the drawings for a more particular description, the invention is shown and described in connection with the front wheels 10, axle 11, the spindle-bars 12 and the coupling-rod 13 which connects the two spindle-bars one with the other, these being well known parts hereinafter called the steering mechanism of the tractor.

Numeral 14 indicates a steering-arm which extends forwardly of the tractor for use with other parts to be described. It may have any suitable connection with the steering mechanism of the tractor, the connection shown herein being a bolt 15 (Fig. 1) which pivotally connects the rear end of said arm 14 with the coupling-rod 13.

I provide a carrier-beam 16 which extends forwardly from the tractor. It may have any suitable mounting of its rear end on the tractor which will permit it to have swinging movements in horizontal and vertical planes, the mounting shown herein to permit it to move vertically being a vertical pivot or bolt 17 (Figs. 1, 5) which is disposed in a vertical socket 18, said socket being secured to a supporting-plate 19. Brackets 20 are secured to the front part of the axle 11 by means of a pair of U-bolts 21. The plate 19 is of angular form and, as clearly shown in Fig. 1, is provided with end-portions which are bent at right-angles to the body of said plate, and by means of horizontal bolts 22 these end-portions of said plate 19 are pivotally maintained on the brackets 20.

In order that the tractor may be automatically steered by means to be described it is necessary that the carrier-beam should have such a mounting that it may have both vertical and horizontal movements, and the mounting as described permits these movements.

Figure 2:
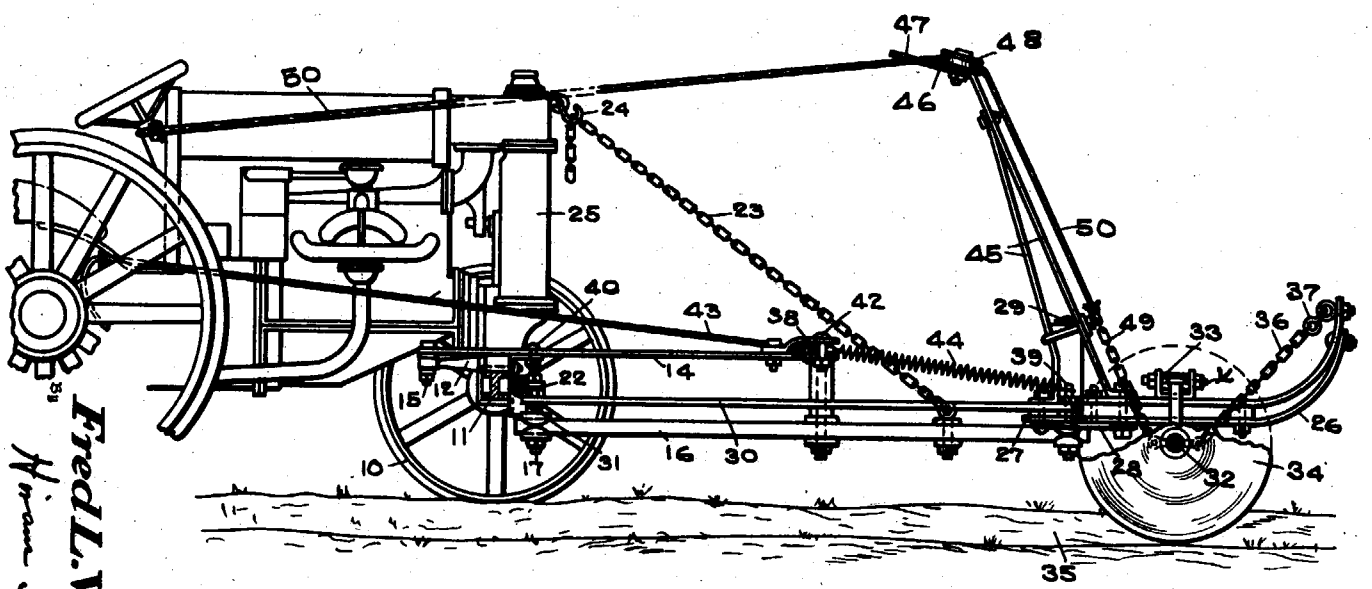
Fig. 2 is a view of the attachment in side elevation, a part of a tractor, in section, being shown.

As best shown in Fig. 2 of the drawings, the carrier-beam is adapted to be supported and held at a suitable distance above the ground by a flexible member or chain 23, the rear end of the chain being adjustably mounted on a hook 24 which is secured to the upper part of the radiator 25, the lower end of the chain being suitably secured to the carrier-beam near the front end thereof.

Numeral 26 indicates a shoe. Its rear end is provided with a horizontal arm 27, also it is provided with a brace-bar 28 which is secured at its outer end to the arm 27. The inner ends of members 27 and 28 are disposed in spaced relation relative to each other and, as clearly shown in Fig. 1 of the drawings, they together with that part of the shoe adjacent thereto form parts triangular in plan. The carrier-beam is provided with a vertical pivot 29 upon which the shoe is mounted, said pivotal mounting for the shoe being between the inner ends of said members 27 and 28; and when the shoe is manufactured said members 27 and 28 may be constructed integral therewith if desired, but if produced separately said members 27 and 28 are secured rigidly with the shoe and have no movements independently of the shoe.

Numeral 30 indicates an equalizing-bar and, as best shown in Figs. 1 and 5 of the drawings its rear end is pivotally mounted by means of a pin 31 upon an extension of the supporting-plate 19 and therefore this bar 30 may have both vertical and horizontal movements, the centers of their arcs of movement being the pivotal mountings of their respective rear ends.

It will be noted that the distance between the pivots 17 and 31 is approximately equal to the length of the horizontal arm 27, and therefore when the carrier-beam is swung either to the right or left of the line of traction said members 16 and 30 will remain parallel with each other. Also it will be noted that during the horizontal movements of these bars they may move toward each other or the reverse.

Numeral 32 indicates a supporting-bar which is hingeably mounted on the shoe as indicated at 33, and upon the outer end of the bar 32 is journalled a pair of discs 34, these two discs being identified as a guide-member adapted to travel in a furrow 35. The bar 32 is pivoted to the hinge 33 as indicated at *x*.

Numeral 36 indicates a brace or flexible member or chain which is secured at its outer end to the bar 32, its inner end being mounted on a hook 37, and it will be understood that the chain 36 may be adjusted longitudinally. This member 36 is for the purpose of resisting stresses directed to the guide-member 34 during operation while the tractor is moving forwardly so that the bar 32 will be disposed approximately at right-angles to the shoe 26. While I have shown and described a chain 26 for the uses mentioned it is obvious that a metallic bar or rod could be substituted therefor and operation would be practically the same.

In operation, no attention of a driver is needed for the tractor except when "turning about" at the end of a field. If the furrow 35 leads in a straight line the line of traction will correspond thereto and the carrier-beam will have no horizontal swinging movement. However, if the furrow has a curvature the carrier-beam 16 will have a horizontal swinging movement and this movement will be communicated to the steering-arm 14 on account of the action of a control-bar 38 which is pivotally connected at its respective ends with said beam 16 and arm 14.

For instance, if the furrow 35 has a curvature to the "right" of the direction of travel of the tractor it is obvious that the beam 16 will swing horizonally toward the "off" side, and the control-bar 38 will be moved longitudinally in the same direction to cause an outward swinging movement of the front end of the steering arm 14, and this last named movement will cause the tractor to move on a line conforming to the curvature of the furrow. Also it will be noted that regardless of the degree of curvature of a furrow the shoe will be maintained parallel with the line of traction, and this feature is of great advantage.

While the tractor is moving forwardly the guide-member 34 will normally remain in the furrow. The supporting-bar 32 will normally be disposed at right-angles to the furrow.

The arm 27 of the shoe is pivotally mounted, as indicated at 39 upon the front end of the equalizing-bar 30 which operates as a fulcrum, and any horizontal swinging movement of the shoe will be coincidently communicated to the steering-arm 13 and to the steering mechanism of the tractor.

In operation, the carrier-beam 16 and equalizing-bar 30 may be disposed in angular rotation to the line of traction, but according to the present construction, the shoe will at all times be maintained parallel with the line of traction, and this feature is of great advantage since the supporting-bar 32 during operation, will be disposed approximately at right-angles to the furrow 35 so that there will be no tendency for the guide-member to leave the furrow while the tractor is moving.

The control-bar 38 operates to advantage for many purposes as will be seen. When operating in rough ground, either plowing or listing, this bar tends to resist side stresses directed to the shoe, the equalizing-bar and carrier-beam, for the reason that it is mounted on the steering arm, and since the latter is pivotally mounted between its ends as indicated at 40, stresses directed to either side of these parts will be resisted.

In operation, it is often desirable to have the tractor move very close to the furrow 35 especially if the ground to be plowed or listed is inclined transversely to the line of traction, and the invention includes such a mounting of the steering-arm that this may be accomplished. By referring to Fig. 1 of the drawings it will be seen that the carrier-beam 16, equalizing-bar 30 and steering-arm 14 are disposed approximately parallel with the line of traction and that the control-bar 38 is provided with notches 41. The steering-arm, at its end, is provided with a downwardly projecting pin 42 adapted to engage in any selected notch 41, and to accomplish this adjustment, a pull-rope 43 is provided. By use of the pull-rope the bar 38 may be swung rearwardly against the force of a spring 44 so that the pin or projection 42 may engage in any selected notch of said bar 38.

When it is desired that the tractor shall move with its "off" wheel close to the furrow the pin 42 is disposed in a notch nearer to the free end of the bar 38, the result being that the steering mechanism of the tractor will be changed to cause the tractor, during its movements, to be disposed closely adjacent to the furrow 35, and during the forward travel of the tractor the carrier-beam 16 and equalizing-bar 30 will remain parallel with reference to each other but they will swing and will be inclined toward the "near" side of the line of traction, that is to say, the tractor and rear ends of members 16 and 30 will be disposed closer to the furrow than before and the front ends of said members 16 and 30 will be disposed the same distance from the furrow as before.

The adjustments just described for the steering-arm 14 proves to be of importance since tractors are now in general use for plowing and listing ground on hillsides and in valleys and rough and undulating ground, and in such instances these adjustments are always made to cause the tractor to travel at a selected distance from the furrow.

It will be noted that when an adjustment has been made as last described the shoe 26 will be disposed parallel with the line of traction, this feature being of importance so that the brace-member or chain 36, in connection with said shoe will maintain the supporting-bar 32 approximately at right-angles to the line of traction.

It will be seen that the function discharged by the spring 44 is to cause a constant pressure of the control-bar 38 so that it will be pressed forwardly against the pin or projection 42 of the steering-arm. This is simply a matter of convenience and I may dispense with this spring 44 and notches 41, if desired, and provide other equivalent means. While I prefer the construction as shown and described I do not wish to be understood as limiting myself in this respect. Also while I have shown the mounting of the rear end of the equalizing-bar 30 to be near the axle upon the supporting-plate 19 and prefer this construction, it is obvious that this equalizing-bar is for the purpose of providing a fulcrum which will pivotally support the end of the arm 27, and I may substitute other means to operate as a fulcrum. Also I may dispense with the use of the bar 28 since it operates simply as a brace to reinforce the arm 27.

When "turning about" at the end of a field or when driving upon a highway, the guide or discs 34 must be removed from the furrow, and therefore I provide means for elevating it and for maintaining it in its elevated position. For these purposes I provide a standard 45 which projects upwardly from the rear end of the shoe and is secured thereto. This standard may be of any suitable construction and may have any suitable height, and as best shown in Fig. 2 of the drawings it, preferably, has a rearward inclination so that it will not be obtrusive when the supporting-bar 32 and its discs 34 have been swung upwardly.

Upon the top of the standard is an inclined head-piece or plate 46 provided with a V-shaped notch 47, and upon the plate 46 is mounted a pair of rollers or pulleys 48. I provide a chain 49 which is secured at one of its ends to the supporting-bar, the opposite end of said chain being provided, preferably, with a rope or cable 50, and an operator, by use of the rope, may cause the supporting-bar and discs to swing upwardly, the chain moving between the pulleys 48, and one of the links of the chain being caught in the V-shaped notch 47, which operates to maintain the supporting-bar 32 and discs in the elevated position mentioned. To release the chain from the notch, an operator shakes the rope in well known manner to cause the chain to swing upwardly from the V-shaped notch and permits the supporting-bar 32 together with its discs to swing downwardly. While I have shown and described a pair of pulleys 48, they are simply for the purpose of controlling the direction of movement of the chain 49 so that one of the links of the chain will become caught suitably in the notch 47. The use of this notch is important in operation but its shape and proportions may be changed in a manner to dispense with the use of the pulleys mentioned.

Since the present invention includes such a mounting for the supporting-bar 32 and guide-member 34 that said bar may be swung in a circle's arc of 180 degrees for operation at either side of the line of traction the requirement of the standard 45 or an equivalent support for a chain 49 is obvious for successful, convenient operation. According to the present construction, an operator, at a remote distance from and rearwardly of the attachment, by use of the rope 50, may cause the supporting-bar 32 to swing a complete half-circle, and since the standard has an upward and rearward inclination said bar and discs 34 will not move into enggement therewith during their swinging movements.

Figures 3, 4:
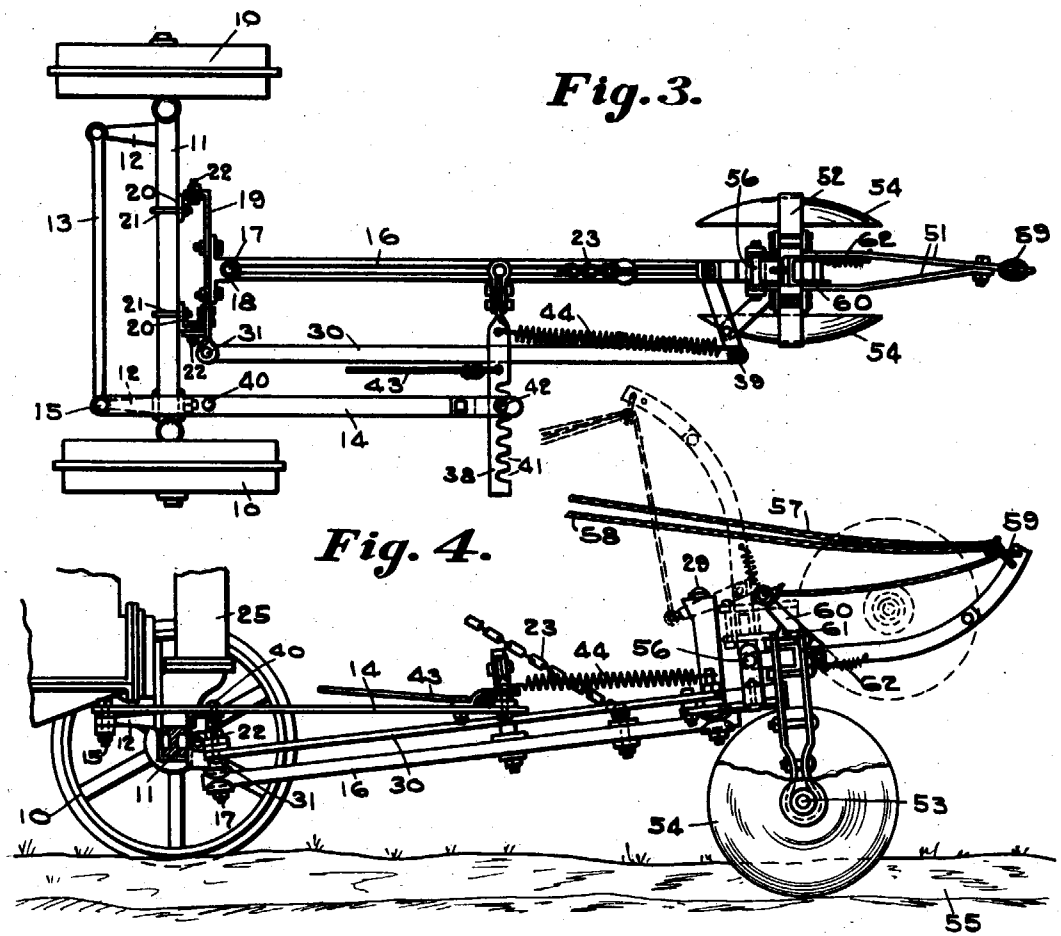
Fig. 3 is a plan view of the attachment arranged for listing.
Fig. 4 is a side view of the parts shown in Fig. 3.

In the modified form of the invention illustrated in Figs. 3 and 4 of the drawings, all of the parts remain the same as have been described except that the shoe 26 together with the supporting-bar 32 with its discs 34 and the chains 32 and 49 are omitted and a shoe 51 is substituted and is mounted to permit horizontal swinging movements on the vertical bolt or pivot-pin 29 already described, said shoe 51 being provided with a yoke 52 to provide bearings for the shaft 53 of a pair of discs 54, said discs operating as a guide-member and adapted to travel in a furrow 55.

The herein described steering attachment for tractors shown in Figs. 3 and 4 of the drawings is used for listing, and it will be understood that a lister (not shown) may be attached to the tractor, rearwardly thereof, and used for cultivating the ground generally or may be used for listing two or more rows of corn, the operation being that furrows will be formed between the rows of corn, and the furrow 55 may be considered as a furrow formed by a lister; and it should be stated that all of the parts heretofore described for steering the tractor, are depended upon during the operation of listing as well as for plowing. In operation, if the furrow 55 has a longitudinal curvature, the guide-member or discs 53 which travel therein will cause a lateral swinging movement of the shoe 51 which will cause a like swinging movement of the carrier-beam 16, and equalizing-bar 30 as well as the steering-arm 14 for steering the tractor, and the shoe 51 will always remain parallel with the line of traction.

When "turning about" at the end of a field the shoe 51 may be swung upwardly as shown in dotted lines in Fig. 4 of the drawings, the shoe being adapted to have swinging movements upwardly and downwardly on its pivotal mounting 56, a cable or rope 57 being secured to a ring at the front end of the shoe so that an operator on the tractor may control the swinging movements mentioned. However, means should be provided for maintaining the shoe in its uppermost position when swung upwardly. I provide a second cable or rope 58 which extends through the ring 59 and is secured at its end to a U-shaped latch 60 which is pivotally mounted on the shoe, and when the shoe is swung downwardly for engagement of its disc in the furrow, the latch is adapted to become caught upon a projection 61 which is mounted on the yoke and which operates as a catch, a spring 62 being employed and having a connection with the shoe and said latch 60 and which normally presses said latch toward its engaging position with said projection 61. During operation, the guide-member 54 may be lifted from the furrow by use of the pull-ropes, the latch 60 moving from its locked position with the projection or catch 61 against the force of the spring 62, and the parts are of such proportions that when the shoe and discs have moved to their uppermost position the latch 60 will become caught on the bolt 29, and the parts will remain in this last named position.

I claim as my invention,—

1. In a steering attachment for tractors, a carrier-beam provided with a shoe and mounted on the tractor to permit vertical and horizontal movements, a supporting-bar hingeably mounted on the shoe to permit vertical movements and pivotally mounted on said shoe to permit horizontal movements, a brace-member connected with the supporting-bar and mounted on the shoe, a guide member rotatably mounted on the supporting-bar and adapted to travel in a furrow and to move the carrier-beam, a steering-arm connected with the steering mechanism of the tractor, and a control-bar movable with the carrier-beam, detachably connected with said steering-arm for actuating said steering-arm and steering mechanism of said tractor.

2. In a steering attachment for tractors, a carrier-beam extending forwardly from and pivotally mounted on the tractor, an equalizing-bar disposed at the side of the carrier-beam and movable therewith, a shoe pivotally mounted on the carrier-beam and fulcrumed on the equalizing-bar, a supporting-bar mounted on the shoe, a guide-member rotatably mounted on the supporting-bar and adapted to travel in a furrow and to move the supporting-bar, said shoe and carrier-beam, a steering-arm connected with the steering mechanism of the tractor, and a control-bar movable with the carrier-beam for moving said steering-arm for actuating the steering mechanism of said tractor.

3. In a steering attachment for tractors, a carrier-beam pivotally mounted on the tractor, a steering-arm connected with the steering mechanism of the tractor, a shoe pivotally mounted on the carrier-beam and provided with an arm, an equalizing-bar pivotally connected with the arm of said shoe and movable with the carrier-beam, a supporting-bar mounted on the shoe, a guide-member mounted on the supporting-bar and adapted to travel in a furrow and cause a movement of the supporting-bar, said shoe and said carrier-beam, and a control-bar movable with the carrier-beam for moving said steering-arm and steering mechanism of the tractor.

4. In a steering attachment for tractors, a carrier-beam and an equalizing-bar each mounted on the tractor to permit horizontal and vertical movements, a steering-arm connected with the steering mechanism of the tractor, a shoe mounted on the carrier-beam to permit horizontal swinging movements therefrom and having an arm pivotally connected with the equalizing-bar, a supporting-bar hingeably mounted on the shoe, a guide-member rotatably mounted on the supporting-bar and adapted to travel in a furrow and cause movements of the supporting-bar, said shoe, said carrier-beam and equalizing-bar, and a control-bar movable by the carrier-beam for moving the steering-arm for moving the steering mechanism of the tractor.

5. In a steering attachment for tractors, a carrier-beam pivotally mounted on the tractor, a steering-arm connected with the steering mechanism of the tractor, a shoe mounted on the carrier-beam and provided with a standard, a supporting-bar hingeably mounted on the shoe, a guide-member mounted on the supporting-bar and adapted to travel in a furrow and to cause a movement of the supporting bar, said shoe and carrier-beam, a chain arranged to engage the standard for removing the guide-member from the furrow, and a control-bar movable with the carrier-beam for actuating the steering-arm and steering mechanism of the tractor.

6. In a steering attachment for tractors, a carrier-beam extending forwardly from and pivotally connected with the tractor, a shoe having an arm and mounted on the carrier-beam, a standard mounted on the shoe and provided at its top with a V-shaped notch, a supporting-bar mounted to permit swinging movements from the shoe, a steering-arm connected with the steering mechanism of the tractor, a guide-member mounted on the supporting-arm and adapted to travel in a furrow and to cause movements of the supporting-bar, said control-bar movable with the carrier-beam for actuating the steering-arm and steering mechanism of the tractor, and a flexible member connected with the supporting-bar and adapted to be moved in the V-shaped notch for moving the guide-member from said furrow.

7. In a steering attachment for tractors, a carrier-beam and an equalizing-bar each pivotally mounted on and extending forwardly from the tractor, a shoe having an arm fulcrumed on the equalizing-bar, and pivotally mounted on the carrier-beam, a steering-arm connected with the steering mechanism of the tractor, a guide-member arranged to swing from the shoe for engaging in a furrow and adapted to move the shoe, said equalizing-bar and carrier-beam, a standard mounted on the shoe and provided with a V-shaped notch, a chain adapted to be moved in the notch of the standard for lifting a guide-member from the furrow, and a control-bar detachably connected with said steering-arm, and movable with the carrier-beam for moving said steering-arm.

8. In a steering attachment for tractors, a carrier-beam pivotally mounted on the tractor and extending forwardly therefrom, a steering-arm connected with the steering mechanism of the tractor, a shoe pivotally connected with the carrier-beam and provided with an arm, an equalizing-bar movable with the carrier-beam and pivotally connected with the arm of said shoe, a guide-member connected with the shoe and adapted to travel in a furrow and to cause movements of the shoe and said carrier-beam, and a control-bar detachably mounted on the steering-bar and movable with the carrier-beam for actuating said steering-bar and steering mechanism of the tractor.

9. In a steering attachment for tractors, a carrier-beam pivotally connected with the tractor, a steering-arm pivotally mounted between its ends and connected with the steering mechanism of the tractor, a shoe mounted on the carrier-beam, a guide-member mounted on the shoe to permit swinging movements therefrom in a vertical plane and adapted to travel in a furrow and cause movements of said shoe and carrier-beam, means for elevating the guide-member from the furrow, means for maintaining the guide-member in elevated position, and a control-bar connected with the steering-arm and moving with the carrier-beam for moving said steering-arm.

10. In a steering attachment for tractors, a carrier-beam pivotally connected with and extending forwardly from the tractor, a steering-arm having a projection and connected with the steering mechanism of the tractor, a shoe mounted on the carrier-beam, a guide-member mounted to permit swinging movements from the shoe and adapted to travel in a furrow and cause movements of the shoe and carrier-beam, a control-bar provided with notches and adapted to be disposed with one of its notches receiving the projection of the steering-arm, resilient means for pressing the control-bar against the projection of the steering-arm, said control-bar being movable with the carrier-beam for actuating said steering-arm.

11. In a steering attachment for tractors, a carrier-beam pivotally connected with the tractor, a shoe having a horizontal arm and pivotally connected with the carrier-beam, a guide-member connected with the shoe and adapted to travel in a furrow and to move said shoe and carrier-beam, an equalizing-bar pivotally mounted on the arm of said shoe and movable with the carrier-beam, a control-bar provided at longitudinal intervals with notches, a steering-arm connected with the steering mechanism of the tractor having a projection and adapted to be disposed with its projection engaging in a selected notch of the control-bar and a resilient element tending to press the control-bar against the projection of the steering-arm, said control-bar being movable with the carrier-beam for actuating said steering-arm.

12. In a steering attachment for tractors, a carrier-beam mounted on and extending forwardly of the tractor, a shoe mounted on the carrier-beam, a supporting-bar mounted on the shoe to permit horizontal swinging movements, a guide-member mounted on the supporting-bar and adapted to travel in a furrow and to move the carrier-beam, a brace-member connected with the supporting-bar and mounted on the shoe, a steering-arm connected with the steering mechanism of the tractor, and a control-bar movable with the carrier-beam and detachably connected with the steering-arm for actuating said steering-arm and steering mechanism of the tractor.

FRED L. WILLRODT.